UNITED STATES PATENT OFFICE.

PERCY R. MIDDLETON, OF NEW YORK, N. Y., ASSIGNOR OF ONE-HALF TO JOHN C. LALOR, OF NEW YORK, N. Y.

METHOD OF TREATING SILVER-BEARING ORES OR RESIDUES.

1,403,516.  Specification of Letters Patent.  Patented Jan. 17, 1922.

No Drawing.   Application filed May 27, 1920. Serial No. 384,755.

*To all whom it may concern:*

Be it known that I, PERCY R. MIDDLETON, a subject of the King of Great Britain, residing at New York, in the county of New York and State of New York, have invented certain new and useful Improvements in Methods of Treating Silver-Bearing Ores or Residues, of which the following is a specification.

This invention is a method of extracting silver together with any gold which may be present, from argentiferous ores or residues. The invention is more particularly applicable to the treatment of residues resulting from the leaching of calcines derived from argentiferous copper or zinc ores, in which residues the silver usually exists both as metal and as sulfid; but the application of the method is not restricted to these particular materials.

It is well known that heavy metal chlorids, including cuprous and cupric chlorids and ferric chlorid, have a certain chlorinating effect upon silver and its compounds; but it has heretofore proven difficult in practice to secure complete and rapid chlorination of silver by the use of these reagents.

I have found that a rapid and complete chloridizing action is secured when the ore or calcine is first moistened by a solution containing one or more of the chlorids of iron or copper, and thereafter dried, preferably at a temperature of 150 to 250° C. The presence of certain other salts, and especially chlorids, appears to accelerate the action.

Following is a specific example of the method in accordance with my invention, it being understood that the invention is not restricted to the particular materials or operating conditions therein described:

The silver-bearing residue from the copper leaching operation is filtered, preferably on a vacuum-type filter, and is then thoroughly moistened or washed with a solution containing cuprous or cupric fluorid or ferric chlorid or mixtures thereof, preferably with the addition of sodium chlorid. The concentration of the solution may vary according to the silver content of the ore or residue, it being of course necessary that sufficient of the chloridizing reagents should remain in the filter cake for the requirements of the reaction.

The filter cake, which usually contains from 10 to 15% of moisture, is then dried, either by direct heat or in a current of hot air, the temperature within the drier being preferably kept at about 200° C., and this temperature being preferably maintained for some 30 minutes after the moisture has been substantially expelled. It is preferred to provide an oxidizing atmosphere throughout this drying or heating treatment. Chlorination having been accomplished, the ore or residue is then leached with an appropriate solvent, such as brine or sodium hyposulfite, and the silver is recovered by any approved method.

When the ore or residue contains metallic silver it may with advantage be preliminarily subjected to a sulfidizing treatment as described in my Patent No. 1,372,973, March 29, 1921; but owing to the highly effective chlorination obtainable as above described, such sulfidizing treatment is not regarded as essential to the successful practice of the invention.

I claim:—

1. A method of extracting silver from ores or residues containing the same, comprising preparing a moist charge containing the ore and a heavy metal chlorid; drying and heating the charge and thereby chlorinating the silver; and extracting the resulting chlorid.

2. Method according to claim 1 in which silver-bearing residues are treated with a chloridizing agent comprising a heavy metal chlorid and a chlorid of an alkali metal.

In testimony whereof I affix my signature.

PERCY R. MIDDLETON.